Sept. 1, 1925.  1,552,022
A. A. WILLSON
RUBBER SHOE
Filed Dec. 11, 1920   2 Sheets-Sheet 2
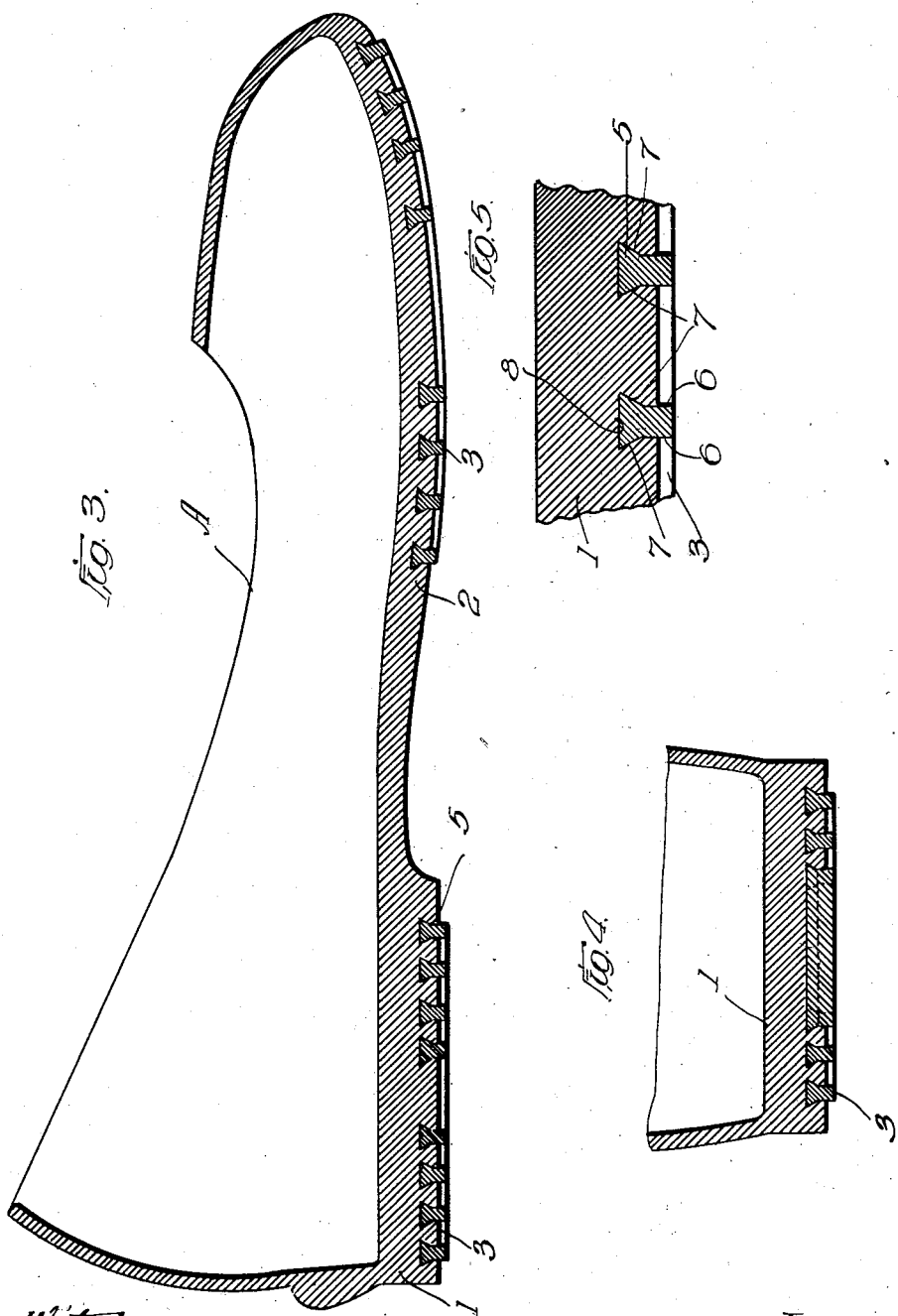

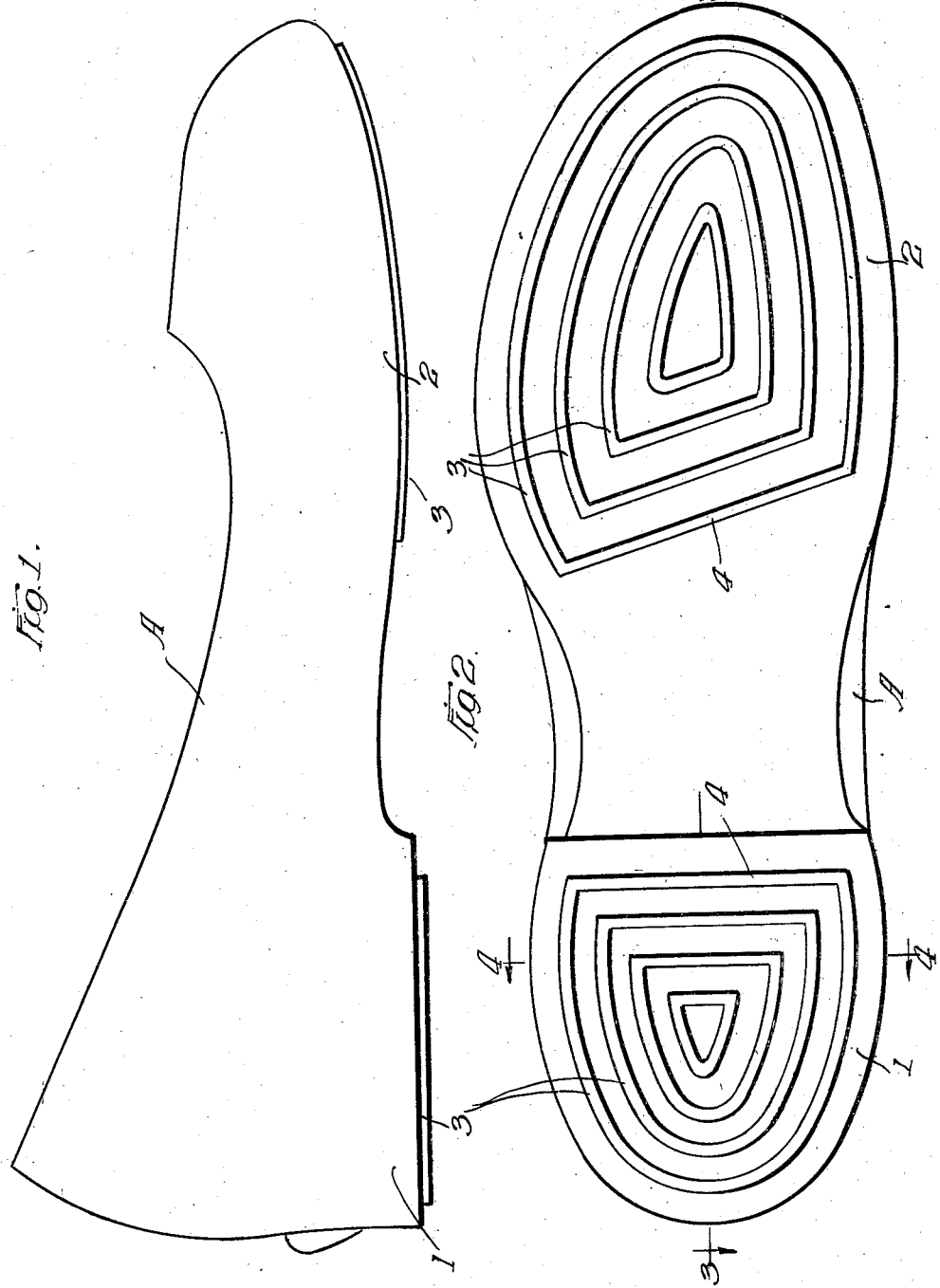

Patented Sept. 1, 1925.

1,552,022

UNITED STATES PATENT OFFICE.

ARTHUR A. WILLSON, OF CHICAGO, ILLINOIS.

RUBBER SHOE.

Application filed December 11, 1920. Serial No. 429,942.

*To all whom it may concern:*

Be it known that I, ARTHUR A. WILLSON, a citizen of the United States, residing at Chicago, in the county of Cook and State of Illinois, have invented certain new and useful Improvements in Rubber Shoes, of which the following is a description.

My invention relates to improvements in rubbers, overshoes and the like, and more particularly to a tread for the same, said tread being provided to increase the wearing qualities of the rubbers and to prevent slipping or skidding when the ground or walks are wet or icy.

Another object of my invention is to provide a tread which is securely held in place without the use of nails, rivets, or the like, the securing being accomplished by providing an enlarged anchoring base on the tread and positioning the tread in the mold at the time of molding the rubber, overshoe, or the like, so that after the rubber is molded, the tread will be securely anchored in place so as to be integral with the sole or heel of the rubber or overshoe.

Another object of my invention is to provide a tread of the character described, so arranged as to project sufficiently beyond the surface of the rubber, heel or sole, so as to take the initial wear, and after the tread has worn down flush with the bottom of the sole or heel, to still maintain its function of taking up wear and preventing slipping or skidding. With these and other objects and advantages in view, the construction herein shown and described will be obvious to those skilled in the art from the disclosure herein given.

To this end my invention consists in the novel construction, arrangement and combination of parts herein shown and described, and more particularly pointed out in the claim.

In the drawings wherein like reference characters indicate like or corresponding parts:

Fig. 1 is a side elevation of a rubber with my invention applied thereto;

Fig. 2 is a bottom plan view of the same;

Fig. 3 is a section taken on line 3—3 of Fig. 2;

Fig. 4 is a section taken on line 4—4 of Fig. 2;

Fig. 5 is a fragmentary section, greatly enlarged, showing the manner of securing the treads to the heel and sole.

In the drawings A represents a body of rubber having a heel portion 1 and a sole portion 2. 3 represents the tread inserts secured to said heel and sole portions, there being a plurality of inserts in both heel and sole, each of said inserts being preferably parallel to the edges of the respective part to which it is attached, and also being endless so as to provide substantially straight lateral or transverse tread portions 4.

The treads are of any suitable fibrous material, such as canvas, or the like, and are secured to the rubber during the molding thereof, thus being securely vulcanized in place so as to be integral with the rubber.

Each tread comprises a body having parallel sides 6 and a base 5, said base being preferably of larger cross-section than the main body portion of the tread, and, as shown in Figs. 3 to 5 inclusive, said base is of wedge or dovetail shape or other equivalent construction so that it may interlock with the rubber, the sides 7 of the dovetail diverging outwardly away from the sides 6 of the body portion, the treads being of greatest width at the intersection of the sides 7 with the base end 8.

It will be noticed in Figs. 3, 4 and 5, that the enlarged base of the tread is positioned so as to be placed inwardly of the tread surface of the rubber, overshoe, or the like, thus greatly increasing the gripping action of the rubber upon the tread.

The treads are preferably secured to the heel and sole by positioning them in the mold and then molding the rubber body so as to be integral therewith.

Thus, there is provided a rubber, overshoe or the like, which in addition to its usual advantages, has a non-slip or non-skid wearing tread which will greatly increase the useful life of the same and guard the wearer from accidents.

The tread receives the entire initial wear similar to the wearing action of the non-skid treads of an automobile tire, and when worn flush with the sole and heel will prevent the rapid wear of these parts, and yet retain its function of preventing slipping or skidding on wet or icy walks.

Having thus described my invention, it is obvious that various immaterial modifications may be made in the same without departing from the spirit of my invention; hence I do not wish to be understood as limiting myself to the exact form, arrange- ment, construction and combination of parts herein shown and described or uses mentioned.

What I claim as new and desire to secure by Letters Patent is:

The combination with a rubber shoe having a rubber bottom, a series of continuous concentric grooves arranged in the bottom of said shoe, each of said grooves having converging side walls near the inner ends thereof with a reduced neck portion having straight walls extending to the surface of said tread, continuous wear strips in said grooves, each of said wear strips at the upper portion thereof being substantially wedge shaped to conform with the contour of the inner ends of said grooves and having reduced extending portions provided with parallel sides passing through the reduced necks of said grooves a substantial distance beyond the bottom of the shoe, said extending portions of said wear strips and the wedge-shaped portions thereof being of material more resistant to wear than the rubber bottom.

In testimony whereof; I have hereunto signed my name.

ARTHUR A. WILLSON.